Sept. 30, 1941.   W. H. D. BROUSE   2,257,591
DISPLACEMENT FLUID METER
Filed Sept. 15, 1939

Inventor.
William H. D. Brouse.

Patented Sept. 30, 1941

2,257,591

UNITED STATES PATENT OFFICE 2,257,591

DISPLACEMENT FLUID METER

William H. D. Brouse, Toronto, Ontario, Canada, assignor, by mesne assignments, to John Wood Manufacturing Company Inc., Conshohocken, Pa.

Application September 15, 1939, Serial No. 295,027

12 Claims. (Cl. 73—247)

The principal objects of this invention are to provide a meter mechanism which may be readily adjusted to obviate error so that fluids may be accurately measured while being dispensed.

This invention relates to meters of the type in which the measurement of the fluid is determined by the displacement of pistons within chambers through which the fluid is caused to flow, and the principal feature of the invention consists in the novel construction and arrangement of operating connections with one or more of the pistons whereby the length of stroke may be varied so as to effect a change in the cubical capacity of the chamber to the flow of fluid therethrough in order to effect the adjustment of the measurement of the fluid being dispensed.

In the accompanying drawing.

Figure 2:
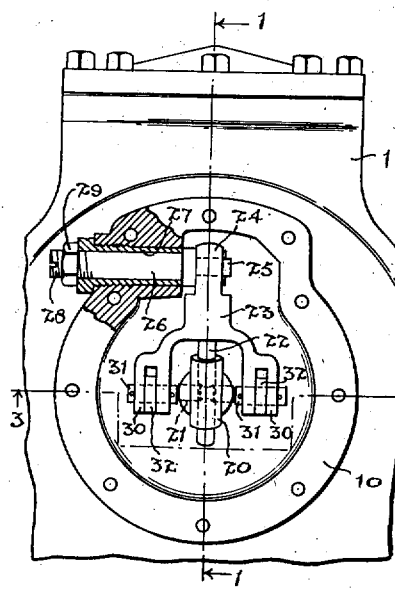
Figure 2 is a part sectional elevational view of the mechanism shown in Figure 1 taken on the line 2—2 of Figure 1.

The present invention is herein shown applied to a type of meter which is commonly known and is illustrated in United States Patent 1,912,687, dated June 6, 1933, in which the meter casing 1 is formed with a plurality of cylinders 2, 3 and 4 arranged in diametrically opposite pairs which extend outwardly from a central chamber 5. The casing 1 has formed therein, extending along one side of each cylinder, a duct 6 which communicates with a port 7 at the outer end of the cylinder and has a port 8 at the opposite end leading to the inner end of the adjacent cylinder. The outer end of each cylinder is closed by a cap 9 and the cylinder 3 has an extension 10.

The piston 11 operating in the cylinder 3 is provided with a central boss 12 through which a central cylindrical orifice 13 is bored and in this cylindrical orifice is slidably mounted a pin 14, on the inner end of which is formed a jaw-shaped member 15. A pin 16 extending across the jaw 15 extends through the connecting rod 17 of the meter which connects with the registering crank pin 18 in the central chamber 5.

The outer end of the pin 14 is slotted transversely to form a jaw-shaped end 19. A block 20 is arranged in the jaw end 19 and is pivotally mounted on the pin 21 extending transversely of said jaw. A pin 22 extends slidably through the block 20 at right angles to the pivot pin 21 and has secured on its upper end a jaw-shaped member 23. This jaw-shaped member has the central portion 24 pivotally mounted on a pin 25 which is eccentrically arranged on a pin member 26 rotatably mounted in a sleeve 27 secured in the side wall of the cylinder extension 10. The pin 26 is provided with a threaded outer end 28 on which is threaded a lock nut 29 to secure the crank pin 26 in adjusted positions.

Each arm of the member 23 is provided with a bifurcated end 30 in which are mounted the transversely arranged pins 31, and on these pins are pivotally mounted the links 32 which extend inwardly and are pivotally connected to pins 33 secured in diametrically opposite arrangement in the boss 12 of the piston 11.

With this construction of device it will be noted that as the crank member 18 of the recording mechanism is operated by the several pistons, being moved progressively by the flow of liquid through their respective cylinders, the connecting rod 17, instead of directly moving the piston 11, moves the pin 14 in the bored orifice 13 in the piston boss.

The inward and outward movement of the pin 14, through the connection of the pin 21, swings the member 23 on the pivot pin 25, which, as described, is eccentrically arranged on the pin 26. The swinging movement of the member 23 moves the piston 11 through the medium of the links 32 and pins 33 in accordance with the setting of the eccentric pin 25. It will therefore be appreciated that the inward and outward movement of the piston may be varied by the simple act of rotating the pin 26 so as to change the position of the eccentric pin support 25 for the member 23, in relation to the pin 21, thus changing the length of movement of the link members and the piston. The outer end of the pin 26 is provided with a cross slot to enable the pin being readily adjusted on the loosening of the lock nut 29.

A variable ratio drive connection is thus established between the piston and the connecting rod 17 and the construction is such that there will be no impact between the relatively movable elements and a smooth and positive drive connection will be maintained at all times between the piston and the connecting rod and crank.

Figure 1:
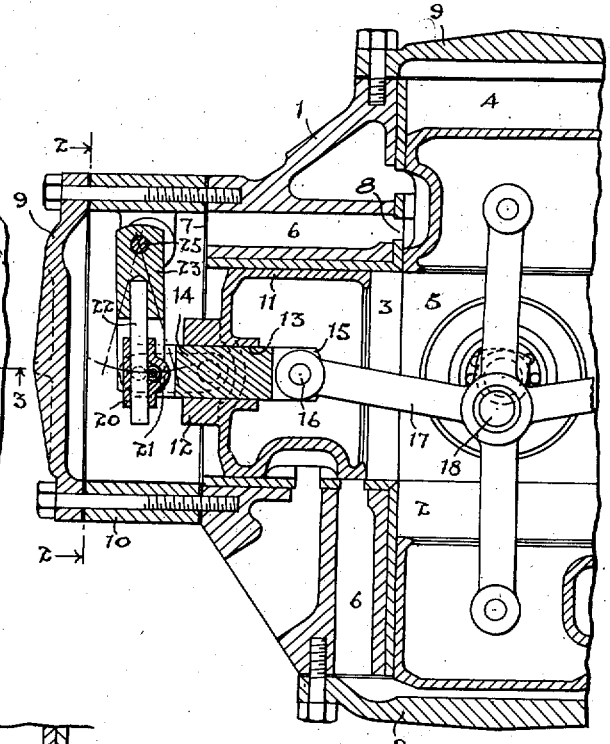
Figure 1 is a part horizontal sectional plan of a piston displacement meter showing one of the pistons equipped with the improved means for altering the stroke thereof, the section being taken through the adjustment mechanism on the line 1—1 of Figure 2.
Figures 3, 4, 5:
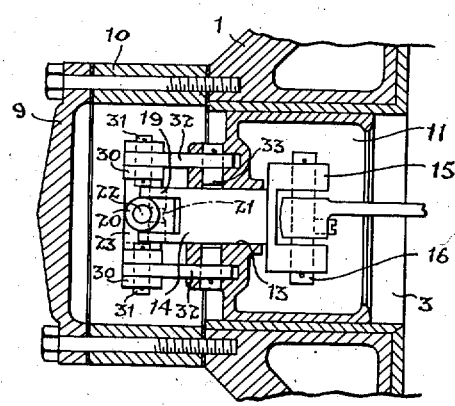
Figure 3 is a horizontal sectional view taken on the line 3—3 of Figure 2.
Figure 4 is an enlarged elevational detail of the crank adjustment pin for effecting a change in the piston stroke.
Figure 5 is an end elevational view of the crank member illustrated in Figure 4.

It will be further observed that the relative sliding displacement between the pin 14 and the piston 11 takes place progressively throughout the length of the piston stroke and, since the forked member 23 swings on pin 25 to either side of the position in which it is shown in Figure 1 causing the block 20 to slide on the rod 22, it will be seen that the drive ratio between the piston and pin 14 and consequently between the piston and recording device will be of a progressively changing character throughout the stroke of the piston.

It will be appreciated that with a structure such as described adjustment of the meter may be very readily accomplished and the meter measurement may be maintained accurately at all times.

What I claim as my invention is:

1. In a displacement fluid meter of the type having at least one measuring cylinder and a fluid displacement piston therein provided with a connecting rod for connection to a recording device or the like, and means forming a variable ratio drive between said connecting rod and piston including a member extending from the connecting rod and slidably receiving the piston, means flexibly connecting said slidable member and piston through axes relatively displaceable in a direction transversely of the piston axis, and means for relatively adjusting said axes.

2. In a displacement fluid meter of the class described having at least one measuring cylinder through which the fluid flows, a fluid displacement piston operating in said cylinder, and a connecting rod adapted to connect said piston with a recording mechanism, means forming a variable ratio drive between the piston and connecting rod throughout the stroke of said piston including a variable link drive connection interposed between said piston and the connecting rod.

3. In a displacement fluid meter of the class described having at least one measuring cylinder through which the fluid flows and a fluid displacement piston operating therein having means adapted to be connected with an indicating mechanism, means forming a variable ratio drive between said piston and said means throughout the stroke of the piston including a plunger-like member slidably mounted in said piston, and link means connected at one end to said piston and extending longitudinally of said plunger-like member, and means forming an operative connection between the other end of said link means and said plunger-like member.

4. In a displacement fluid meter having pistons operating in measuring cylinders and adapted to be connected with a recording device, a pin slidably mounted in one of said pistons and connected with the recording device, a forked member pivotally connected to said pin, a rotatably adjustable eccentric adjustably supporting said forked member, and links connecting said forked member with said piston.

5. In a displacement fluid meter having pistons operating in measuring cylinders and adapted to be connected with a recording device, a pin slidably mounted in one of said pistons and connected with the recording device, a forked member pivotally connected to said pin, a main pin member rotatably adjustable in the meter casing and having an eccentrically disposed pin extension pivotally and adjustably supporting the forked member, means operatively connecting said forked member with the said piston, and means for locking said main pin member in the casing in adjusted positions.

6. In a displacement fluid meter of the class described having a measuring cylinder and a fluid displacement piston operating in said cylinder, a pin slidably mounted in said piston, a connecting rod pivotally connected with said pin and adapted to be operatively connected with a recording mechanism or the like, the outer end of said pin having a forked end, a block pivotally mounted in the outward forked end of said pin, a forked member operatively engaging said pivotally mounted block, links connecting the forked ends of said latter forked member to the piston, and an eccentrically mounted member pivotally and adjustably supporting the outward end of said latter forked member.

7. In a meter having a plurality of measuring cylinders provided with pistons having connecting rods adapted to operate a recording mechanism, at least one of said pistons being slidably associated with its connecting rod for varying the effective piston stroke, means for causing the said piston to travel axially in the cylinder throughout its effective stroke at a variable speed constantly different from the speed of axial advance of the slidably associated portion of its connecting rod, to thereby variably predetermine the operation of the recording means in respect to the flow of fluid through the meter.

8. A meter as claimed in claim 7 in which said means includes a pin slidably mounted in and extending axially through the piston and pivotally connected to the piston rod at one side of the piston and means pivotally connecting the slidable pin and the piston on the other side of the piston through relatively displaceable axes.

9. In a displacement fluid meter of the type having at least one measuring cylinder, a fluid displacement piston, a crank member for actuating a recording mechanism or the like, and a connecting rod operatively interposed between said crank member and piston, means forming an operative connection between said piston and said connecting rod including means independent of said crank for providing a variable ratio drive between said piston and said connecting rod continuously throughout the entire effective stroke of the piston.

10. In a displacement fluid meter of the class described having at least one measuring cylinder through which the fluid flows and a fluid displacement piston operating therein having means adapted to be connected with an indicating mechanism, means forming a variable ratio drive between said piston and said means throughout the stroke of the piston including a plunger-like member slidably mounted in said piston, link means connected at one end to said piston and extending longitudinally of said plunger-like member, and a variable ratio drive connection between the other end of said link means and said plunger-like member.

11. In a displacement fluid meter of the class described having at least one measuring cylinder through which the fluid flows and a fluid displacement piston operating therein having means adapted to be connected with an indicating mechanism, means forming a variable ratio drive between said piston and said means throughout the stroke of the piston including a plunger-like member slidably mounted in said piston, link means connected at one end to said piston and extending longitudinally of said plunger-like member, and a variable ratio drive connection between the other end of said link means and said plunger-like member, including means for adjusting the said other end of said link means in a direction transversely to the axis of said plunger-like member.

12. In a displacement fluid meter of the class described having at least one measuring cylinder through which the fluid flows and a fluid displacement piston operating therein having means adapted to be connected with an indicating mechanism, means forming a variable ratio drive between said piston and said means throughout the stroke of the piston including a plunger-like member slidably mounted in said piston, link means connected at one end to said piston and extending longitudinally of said plunger-like member, a variable ratio drive connection between the other end of said link means and said plunger-like member, including a swingable member adjustably mounted independent of said piston and pivotally connected to said other end of said link means, and means forming a combined pivotal and sliding connection between said swingable member and said plunger-like member.

WILLIAM H. D. BROUSE.